United States Patent

[11] 3,544,039

[72] Inventors William P. Lynch
Honeoye Falls;
Philip A. Payne, Rochester; Albert B.
Zornow, Pittsford, New York
[21] Appl. No. 805,175
[22] Filed March 7, 1969
[45] Patented Dec. 1, 1970
[73] Assignee Eastman Kodak Company
Rochester, New York
a corporation of New Jersey

[54] ADAPTER ASSEMBLY FOR CASSETTES
5 Claims, 5 Drawing Figs.
[52] U.S. Cl. .................................................. 242/197;
352/72
[51] Int. Cl. .................................................. G03b 1/04;
G11b 15/32, G11b 23/04
[50] Field of Search ........................................... 242/197-
—200; 352/72—78

[56] References Cited
UNITED STATES PATENTS
3,031,921 5/1962 Lipsitz ........................ 88/23

| | | | |
|---|---|---|---|
| 3,186,321 | 6/1965 | Kimrey ...................... | 95/31 |
| 3,282,520 | 11/1966 | Hunt ....... ..................... | 242/208 |
| 3,342,431 | 9/1967 | Mouissie ..................... | 242/197 |

Primary Examiner—Leonard D. Christian
Attorneys—Robert W. Hampton and Milton S. Sales ABSTRACT: This invention relates to an adapter assembly for a cassette of the type having an outer drum and an inner core upon which film is wound. A clamp within the core secures one end of the film and is arranged to be opened by a release lever after the film has been unwound from the core. The adapter assembly includes a trigger pin which is normally held away from the cassette so that the cassette may be easily inserted into the assembly without interference from the trigger pin. Upon opening the outer drum of the cassette, the trigger pin is automatically lowered through the opening into contact with the film convolutions to rest thereon as the film is unwound from the inner core. After the last convolution has been unwound, the pin drops into a recess in the core where it engages the release lever to open the clamp and release the end of the film from the cassette.

WILLIAM P. LYNCH
PHILIP A. PAYNE
ALBERT B. ZORNOW
INVENTORS

BY Milton S. Sales

Robert W. Hampton
ATTORNEYS

WILLIAM P. LYNCH
PHILIP A. PAYNE
ALBERT B. ZORNOW
INVENTORS

BY Milton S. Sales

Robert W Hampton
ATTORNEYS

WILLIAM P. LYNCH
PHILIP A. PAYNE
ALBERT B. ZORNOW
INVENTORS

BY Milton S. Sales

Robert W. Hampton
ATTORNEYS

WILLIAM P. LYNCH
PHILIP A. PAYNE
ALBERT B. ZORNOW
INVENTORS 3,544,039

ADAPTER ASSEMBLY FOR CASSETTES

BACKGROUND OF THE INVENTION

1. Field of the Invention

The present invention relates to an adapter assembly for cassettes having a core upon which a strip of web material is wound with an end clamped within the core, the adapter assembly being arranged to automatically release the strip from the core as it is withdrawn from the cassette.

2. Description of the Prior Art

Cassettes of the type described herein are known in the art and are used primarily, but not exclusively, for photographic film processors. Such a cassette includes a cylindrical outer drum having a window, an inner drum rotatable within the outer drum and having an opening corresponding to the window in the outer drum. When the inner drum opening and the outer drum window are alined access may be had to the interior of the outer drum so that the film or other web material may be loaded into or withdrawn from the cassette. When rotated from that position, the inner drum forms a lighttight seal with the outer drum. A lug on the inner drum extends radially through an annular slot in the outer drum, the ends of the slot forming limits to the amount of travel of the inner drum. The cassette further includes a cylindrical core mounted coaxially with the outer drum and rotatable relative thereto. The core includes a slot into which an end of the film is inserted and a clamp in the slot to hold the film end. The clamp has a release lever which extends into an annular groove in the core. Rotation of the release lever against the clamp-closing force of a spring opens the clamp to release the film when the end of the film is reached.

Such cassettes are designed to cooperate with a trigger pin which is pivotally mounted to an adapter assembly arranged to receive the cassette. The trigger pin is spring biased so that one of its ends enters the window opening as the inner drum is rotated to open the window. The trigger pin then rests upon the outer convolution of the film and rides thereon as the film is removed from the inner core. After the last convolution of the film is removed, the end of the trigger pin falls into the annular groove in the inner core and abuts with the release lever so that further rotation of the inner core opens the clamp to release the end of the film. Since the trigger pin is constantly biased towards its operative position, it must be manually held away from the cassette as the cassette is inserted or withdrawn from the adapter assembly and while the window is being closed.

SUMMARY OF THE INVENTION

It is an object of the present invention to provide an adapter assembly for cassettes of the type described above, wherein a trigger pin on the assembly serves to release the end of the web material as it is being removed from the cassette, the trigger pin being automatically operable to position itself in a position which will not interfere with the cassette operation whenever the cassette is closed and to automatically assume an operative position when the cassette is opened to present the film for removal.

In accordance with the preferred embodiment of the present invention, the trigger pin is normally held away from contact with the cassette by a spring. As the cassette is opened, the lug on the inner drum of the cassette pulls the trigger pin against the force of the spring into its operative position within the cassette.

The invention, and its objects and advantages, will become more apparent in the detailed description of the preferred embodiments presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

The Cassette

Figure 1:
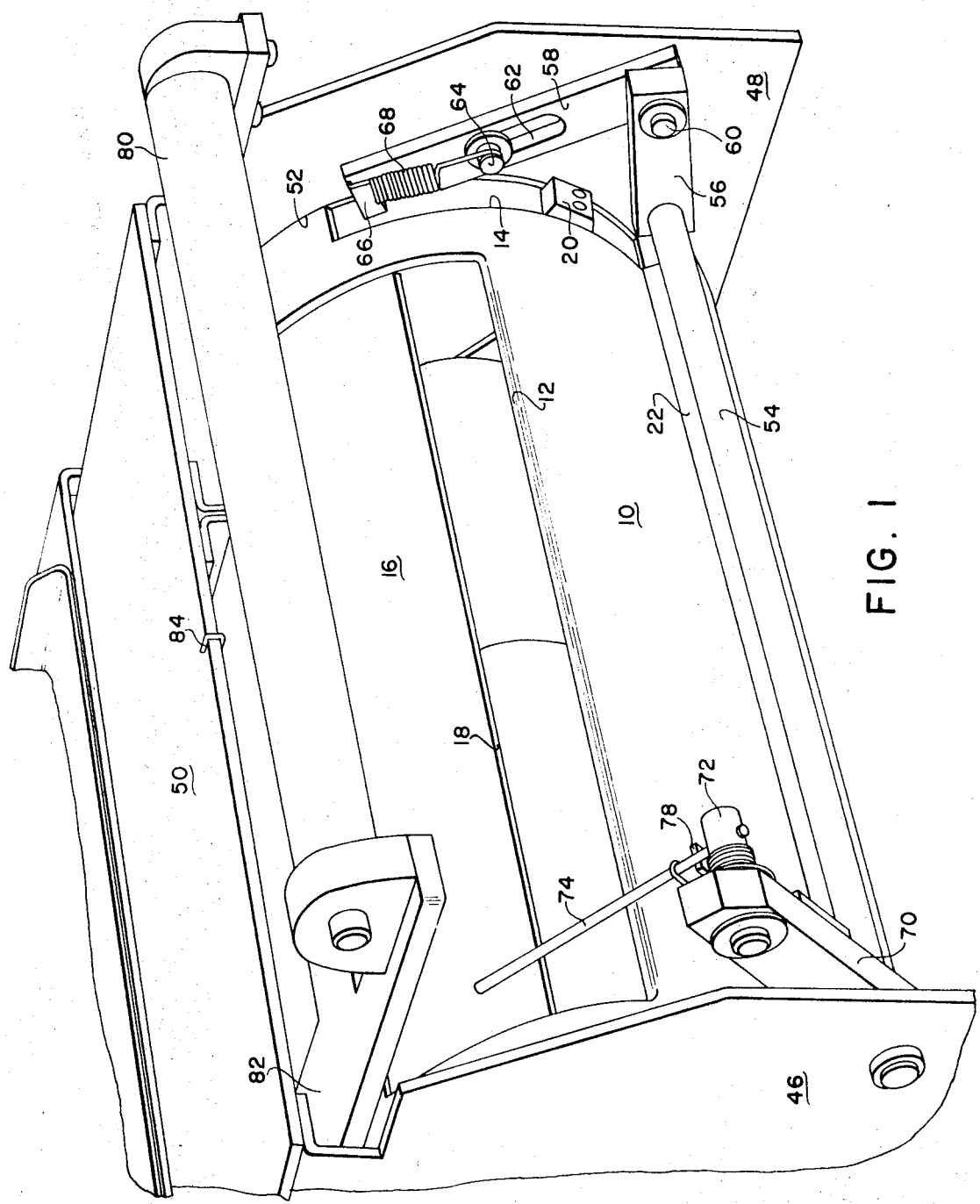
FIG. 1 is a fragmental view of the adapter assembly of the present invention showing the cassette inserted in the adapter and partially opened.
Figure 2:
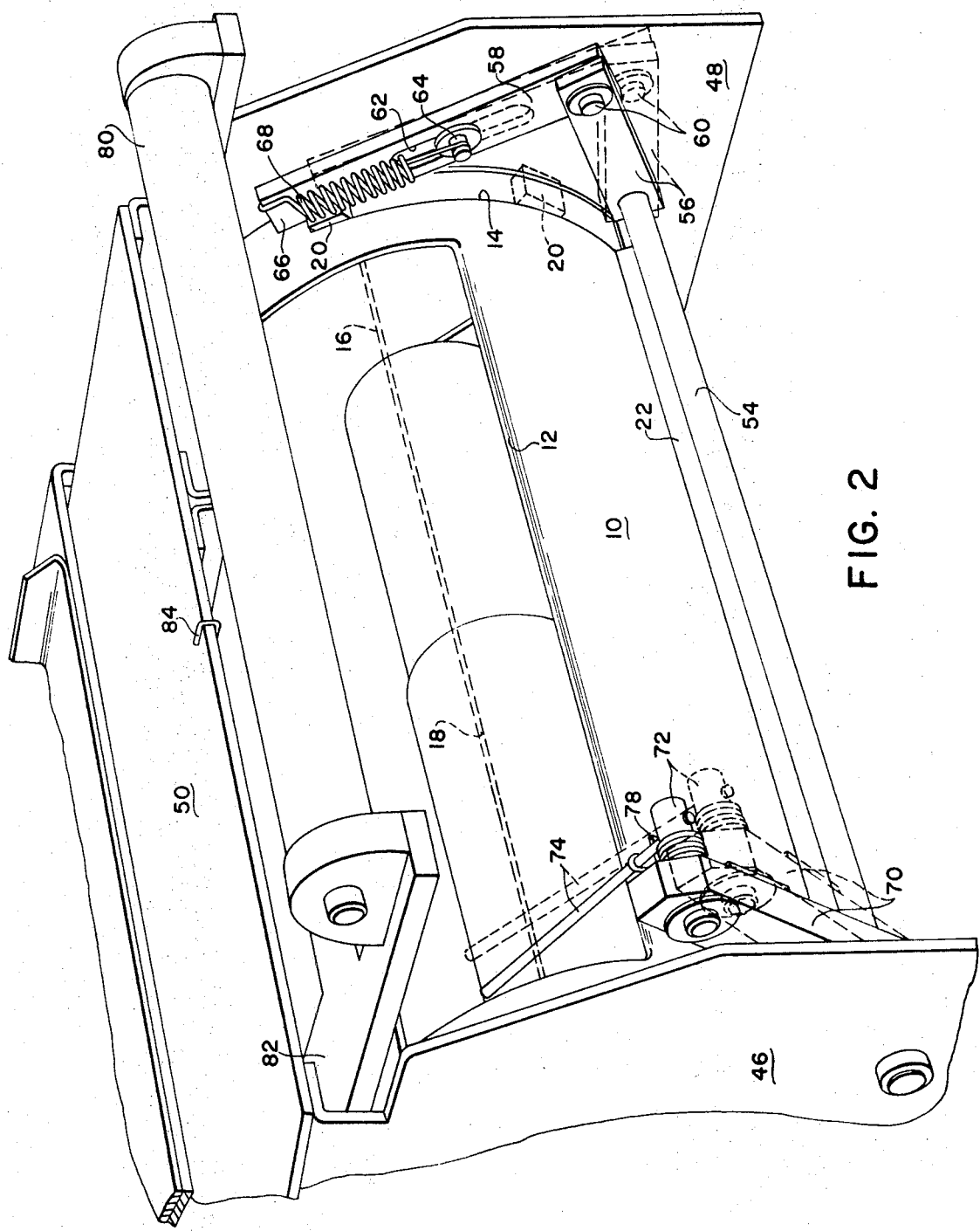
FIG. 2 is similar to FIG. 1 wherein the cassette has been fully opened.

The adapter assembly shown in the preferred embodiment is arranged to receive a conventional cassette. Referring to FIG. 1, the cassette shown has a cylindrical outer housing or drum 10 with openings 12 and 14 forming a window and an annular slot, respectively. An inner drum 16 is rotatably carried within outer drum 10. Inner drum 16 has an opening 18 which can be alined with window 12 to provide access to the interior of the cassette. The inner drum carries a lug 20 slidable in slot 14 between a position where inner drum 16 forms a lighttight closure with window 12 and a position where opening 18 is alined with window 12. These positions correspond to the position of lug 20 at bottom and top extremities of annular slot 14 as shown in FIG. 1. Outer drum 10 carries a key 22 which has the same cross-sectional shape as lug 20 and is alined with the lug when window opening 12 is closed. FIG. 2 shows the adapter assembly and cassette when lug 20 is positioned at the upper extremity of slot 14.

Figure 3:
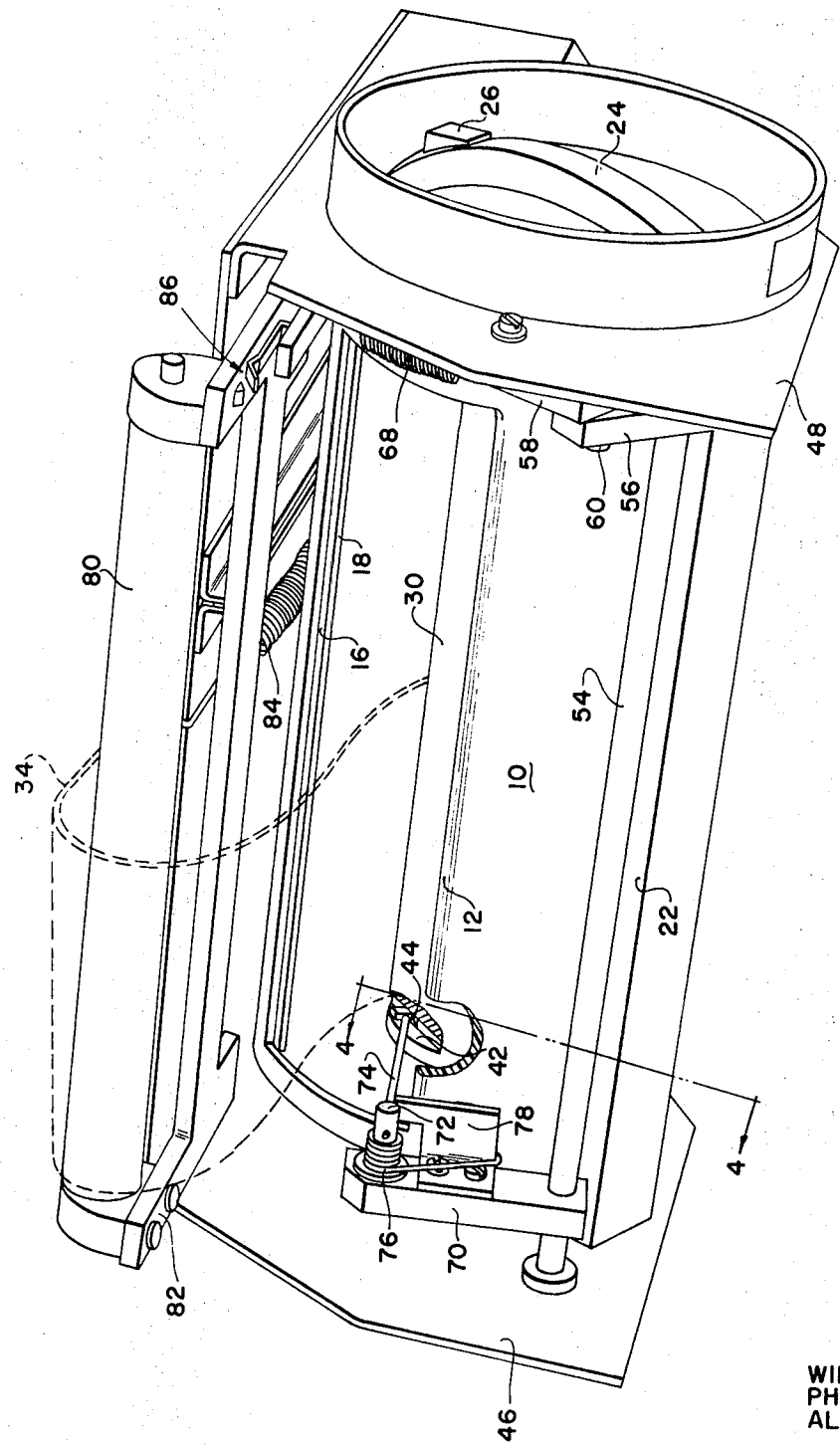
FIG. 3 is a pictorial view of the adapter assembly of the present invention showing the assembly operation during film release from the inner core of the cassette.

With reference to FIG. 3, inner drum 16 is provided with a handle for manually turning the inner drum in a clockwise direction with respect to outer drum 10 to open window 12 and to thereby provide access to the interior of the cassette. Handle 24 has a spring-loaded, detent lock mechanism, not shown, which is actuated by thumb button 26. The outer drum has an annular ridge 28 which serves as a limit stop when the cassette is inserted into the adapter as set forth hereinafter.

A core 30 is rotatably carried within and coaxial with drums 10 and 16. Core 30 has a slot 32 (FIGS. 4 and 5) into which an end of a strip of web material 34 may be inserted. The end of strip 34 is secured in slot 32 by a clamp member 36 made up of a pivoted lever 38 and a biasing spring 40 arranged to bias the clamp towards its closed position.

Figure 4:
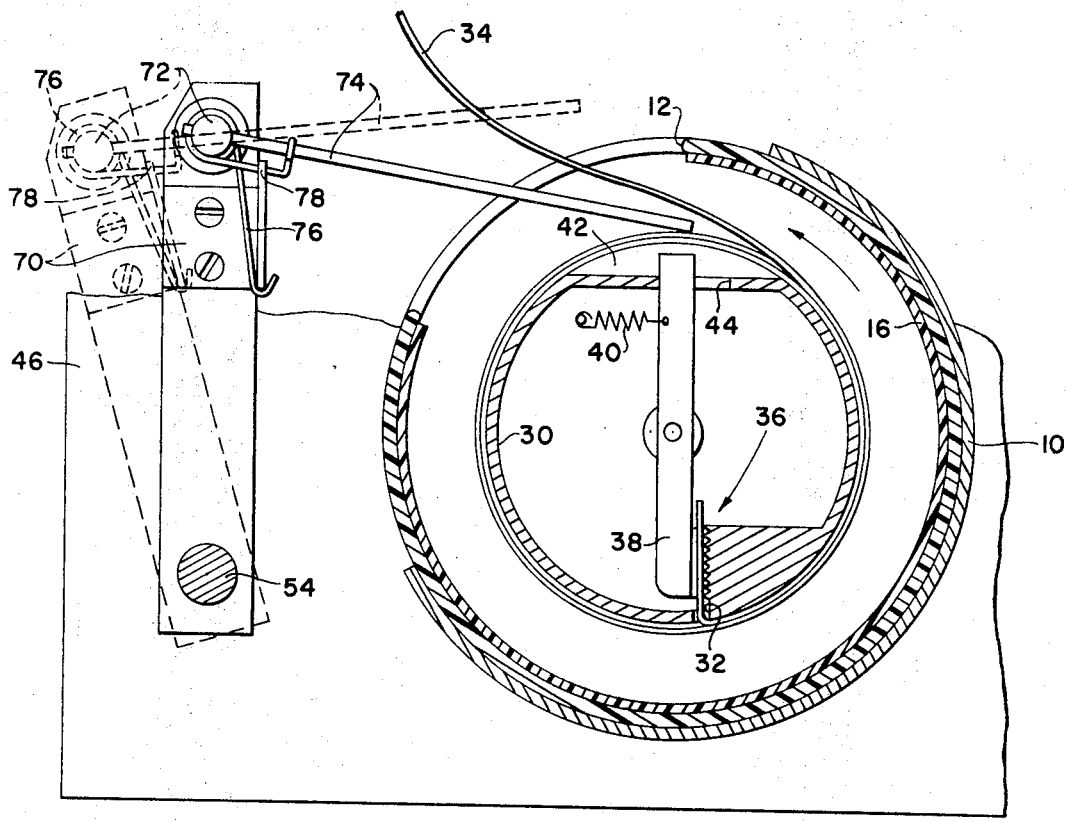
FIG. 4 is a sectional view taken along line 4—4 of FIG. 3 showing the position of parts while film is being removed from the inner core.
Figure 5:
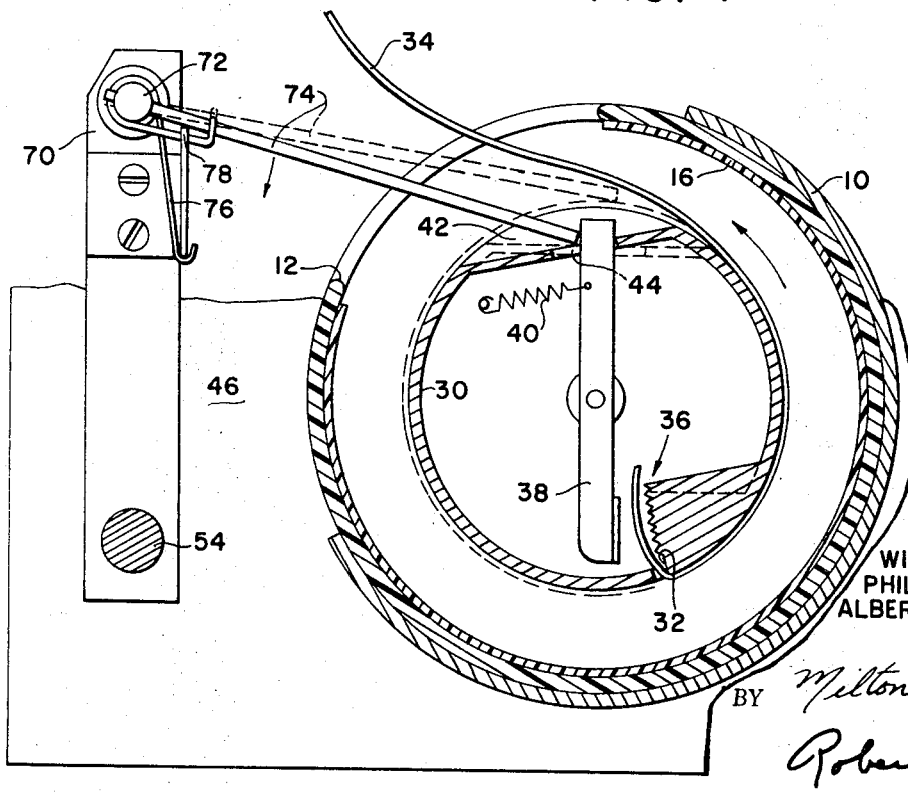
FIG. 5 is a sectional view similar to FIG. 4 showing the position of parts after the last convolution of film has been removed from the inner core.

Core 30 has a groove 42 into which one end of lever 38 extends through a slot 44. Spring 40 biases the upper end of lever 38 towards the left extremity of slot 44 as seen in FIGS. 4 and 5 to close clamp 36. When lever 38 is rotated in a clockwise direction relative to core 30 by means to be described hereinafter, clamp 36 is opened to release the end of web material 34.

The Adapter Assembly

The adapter assembly has side plates 46 and 48 and a top plate 50. Side plate 48 has a circular cutout 52 positioned so that outer drum 10 of the cassette may be inserted through that plate. The circular cutout has a notch corresponding in size and position to key 22 and lug 20 on outer drum 10. Thus, once the cassette is inserted into the adapter assembly and inner drum 16 is rotated, lug 20 locks the cassette in the adapter assembly. Annular ridge 28 on outer drum cooperates with lug 20 to tightly lock the cassette in place.

A shaft 54 is rotatably mounted in bearings in side walls 46 and 48. The right end of shaft 54, as seen in FIG. 1, carries a rigidly mounted arm 56 extending radially therefrom. A second arm 58 is rotatably mounted on the outward end of arm 56 by a stud 60. Arm 58 has a slot 62 which rides on a peg 64 on side plate 48. The upper end of arm 58 has a lug 66 extending into the path of lug 20 as it travels along annular slot 14. A spring 68 attached to peg 64 acts on the upper end of arm 58 to maintain the shaft in the illustrated position.

A second arm 70 is supported at the other end of shaft 54 to be rotated therewith. A stud 72 is rotatably carried at the other end of arm 70 and supports a trigger pin 74 which extends generally towards the cassette. Trigger pin 74 is biased for rotation in a clockwise direction as shown in FIGS. 4 and 5 by a spring 76. The trigger pin normally rests upon a support plate 78 which is mounted to arm 70. In the position shown in FIG. 1, spring 68 has rotated shaft 54 to pull arm 70 and trigger pin 74 away from the cassette.

A roller 80 is carried by a slide 82 which is movably mounted below top plate 50. A spring 84 (FIG. 3) is tensioned between the slide and the top plate to bias the slide outwardly. The connection between the spring and the slide is now shown. The purpose of the slide will be described in detail hereinafter.

Operation

Assuming that the cassette contains exposed photographic film to be processed, it is inserted through side plate 46 with lug 20 alined with key 22. In this position of lug 20, inner drum 16 is rotated to a position underlying window 12 to form a lighttight seal. As the cassette is inserted, trigger pin 74 has assumed its position shown in FIG. 1 so as not to interfere with the cassette. After lug 20 has passed side plate 48, the operator manually depresses thumb button 26 to release the detent lock mechanism. The operator can now rotate the inner drum by handle 24 until lug 20 reaches lug 66 on arm 58. Further rotation of lug 20 and the inner core draws arm 58 upwardly to rotate shaft 54. This movement shifts the upper end of arm 70 towards now opened window 12 so that the end of trigger pin 74 enters the window and rests above groove 42 upon the outer convolution of film 34. Shaft 54 and arm 70 continue to rotate until trigger pin 74 is lifted from support plate 78 against the force of spring 76. FIG. 4 shows in phantom lines the positions assumed by arm 70 and trigger pin 74 before the cassette is opened and in full lines the position assumed after the cassette is fully opened.

The outer end of film 34 is now manually withdrawn from the cassette through window 12 and fed around roller 80 to the input of a machine such as an automatic film processor; see FIG. 3. Of course, the entire operation after the cassette is opened must be conducted under darkroom conditions if the cassette contains photographic film. The processor pulls film from core 30 which rotates in a counterclockwise direction as seen in FIGS. 4 and 5. Referring to FIG. 5, as the last convolution of film is removed from core 30, trigger pin 74 drops from its phantom line position to its full line position within groove 42 where it abuts the upper end of lever 38. Continued rotation of core 30 relative to lever 78, which has been stopped by trigger pin 74, opens clamp 36 to permit withdrawal of the inner end of film 34 from slot 32.

As mentioned hereinbefore, roller 80 is mounted on slide 82 which is biased outwardly by spring 84. Should the film jam in the cassette, slide 82 is drawn inwardly by the resulting tension of film 34 to activate a safety cutout switch 86 and stop the processor, thus preventing destruction of the film.

After all the film or other web material has been removed from the cassette, handle 24 may be rotated in a counterclockwise direction to close window 12 by rotating inner drum 16. As the inner drum is rotated, lug 20 is lowered in slot 14 so that spring 64 can return arms 58 and 56 to their positions shown in FIG. 1. This of course rotates shaft 54 and arm 70 to withdraw trigger pin 74, permitting closure of window 12 and removal of the cassette from the adapter assembly without interference with the trigger pin.

The invention has been described in detail with particular reference to preferred embodiments thereof, but it will be understood that variations and modifications can be effected within the spirit and scope of the invention.

We claim:
1. An assembly adapted to receive a cassette of the type comprising:
 a. an outer housing;
 b. a window in the housing;
 c. a cover for the window movable between open and closed positions;
 d. a core rotatably mounted in the housing upon which convolutions of a strip of web material may be wound, the core having
  1. a clamp in which one end of the strip may be secured; and
  2. a release lever normally covered by the convolutions of the strip and operatively connected to the clamp for releasing the strip;
said assembly comprising:
 a. a movable trigger pin positioned adjacent the release lever when the cassette is received in said assembly;
 b. means normally holding said trigger pin away from the cassette; and
 c. means operatively connected to the cover at least during the cover's movement to its open position for moving said trigger pin into contact with the convolutions of the strip and for moving said trigger pin into actuatable contact with the release lever in the absence of the strip, whereupon the clamp is opened to release the secured end of the strip.

2. An assembly adapted to receive a cassette of the type comprising:
 a. an outer housing;
 b. a window in the housing providing access to the interior thereof;
 c. a cover for the window, the cover being movable between open and closed positions;
 d. a lug on the cover and movable therewith; and
 e. a core rotatably carried in the housing for receiving convolutions of a strip of web material to be wound thereon, the core having;
  1. a clamp in which the inner end of the strip of web material may be secured;
  2. a recess in the surface of the core; and
  3. a release lever in the recess operatively connected to the clamp for releasing the inner end of the strip of web material;
said assembly comprising:
 a. a trigger pin positioned to overlie the recess when the cassette is received in said assembly;
 b. means normally holding said trigger pin away from the cassette; and
 c. means positioned to engage the lug during movement of the lug as the cover moves toward its open position for moving said trigger pin into engagement with the convolutions of the strip of web material and for moving said trigger pin into the recess to contact the release lever in the absence of web material, whereupon said trigger pin abuts the release lever to open the clamp and release the inner end of the strip of web material secured thereby.

3. An assembly adapted to receive a cassette of the type comprising:
 a. a cylindrical drum;
 b. a window in the drum providing access to the interior thereof;
 c. an arcuate, lighttight cover for the window mounted for rotation about the drum axis;
 d. a lug on the cover and movable therewith whereby rotation of the cover in a direction to close the window moves the lug in one direction and rotation of the cover in a direction to open the window moves the lug in another direction; and
 e. a core rotatably carried in the drum coaxial therewith for receiving convolutions of a strip of web material to be wound thereon, the core having;
  1. a clamp in which the inner end of the strip of web material may be secured;
  2. a groove in the surface of the core; and
  3. a release lever in the recess operatively connected to the clamp for releasing the inner end of the strip of web material;
said assembly comprising:

a. a trigger pin positioned to overlie the groove when the cassette is received in said assembly;
b. means biasing said trigger pin in a direction away from the cassette; and
c. means positioned to engage the lug during movement of the lug in said other direction for moving said trigger pin into engagement with the convolutions of the strip of web material and for moving said trigger pin into the groove to abut with the release lever in the absence of web material covering the groove, whereupon said release lever opens the clamp to release the inner end of the strip of web material secured thereby.

4. An assembly comprising:
a. a member movable in first and second directions;
b. means biasing said member in said first direction;
c. a pin mounted on said member for rotation about an axis extending generally perpendicular to said first and second directions, said pin extending perpendicular to said axis;
d. means biasing said pin for rotation about said axis;
e. an abutment on said member preventing rotation of said pin past a position substantially alined with said second direction; and
f. means for selectively moving said member in said second direction against the force of said member biasing means.

5. An assembly comprising:
a. a rotatable shaft;
b. an arm fixed to and extending radially from said shaft;
c. means biasing said shaft for rotation in a first angular direction;
d. a pin mounted on said arm for rotation about an axis extending parallel to and spaced from said shaft; said pin extending perpendicular to said axis;
e. means biasing said pin for rotation about said axis in a direction opposite to said first angular direction;
f. an abutment on said arm in the path of said pin for preventing rotation of said pin past a position substantially perpendicular to a plane defined by said shaft and said axis; and
g. means for selectively rotating said shaft in said angular direction opposite to said first angular direction.